United States Patent [19]
Berger

[11] Patent Number: 5,876,050
[45] Date of Patent: Mar. 2, 1999

[54] TRANSPORTABLE MUSICAL INSTRUMENT AMPLIFIER CART AND STAND

[76] Inventor: Ronald Peter Berger, Three Mountain View, Naples, Me. 04055

[21] Appl. No.: 873,519

[22] Filed: Jun. 12, 1997

[51] Int. Cl.$^6$ ........................................................ B62B 1/00
[52] U.S. Cl. ........................ 280/79.2; 248/130; 248/139; 248/141; 248/142
[58] Field of Search ................................... 280/79.2, 79.3

[56] References Cited

U.S. PATENT DOCUMENTS

| | | |
|---|---|---|
| 4,321,874 | 3/1982 | Cenna, III . |
| 4,660,791 | 4/1987 | Lisak ........................................ 248/141 |
| 5,024,407 | 6/1991 | Bartley . |
| 5,190,254 | 3/1993 | Maguire . |
| 5,275,365 | 1/1994 | Gerbel ..................................... 248/130 |

Primary Examiner—Robert J. Oberleitner
Assistant Examiner—C. J. Bartz
Attorney, Agent, or Firm—Bell Seltzer Intellectual Property Law Group of Alston & Bird LLP

[57] ABSTRACT

A cart for transporting and supporting electronic equipment such as musical instrument amplifiers includes a wheeled open frame which defines an amplifier-receiving space therein. The frame rotatably supports an amplifier support chassis so that the support chassis is pivotable about a pivot axis for varying the angular orientation of a piece of equipment supported on the support chassis. The support chassis includes inner and outer members telescopingly interconnected for adjusting the depth of the support chassis. A fulcrum bar rotatably supported by the frame is affixed to the support chassis for providing the pivotal capability to the support chassis. A locking mechanism is provided for fixing the support chassis in a selected orientation, and a restraint is attached to the frame for encircling and restraining a piece of equipment supported in the cart.

13 Claims, 2 Drawing Sheets

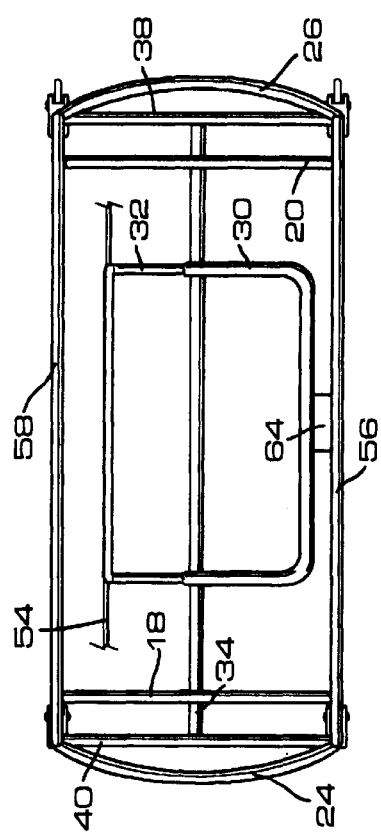
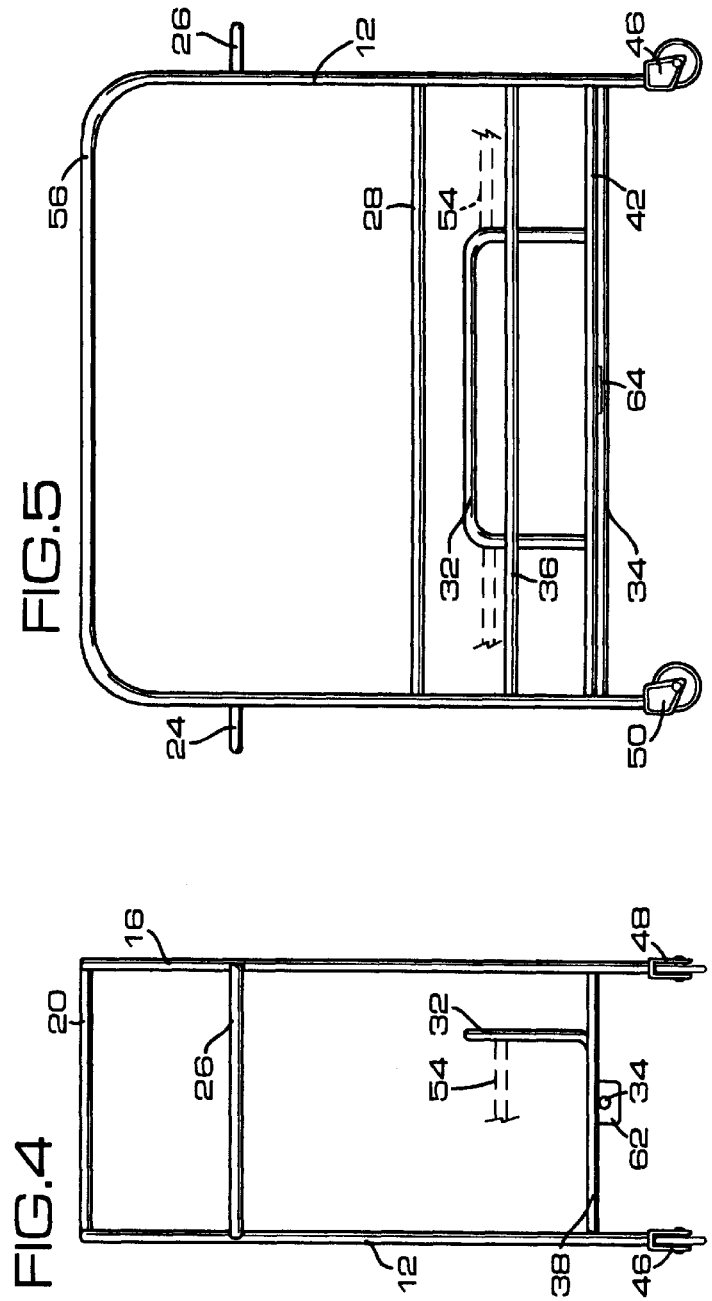

TRANSPORTABLE MUSICAL INSTRUMENT AMPLIFIER CART AND STAND

BACKGROUND OF THE INVENTION

1. Field of the Invention

This invention relates to an improvement in mobile transport carts which are used to transport and position musical instrument amplifiers. The amplifier cart of the present invention functions by encapsulating the amplifier in a protective tubular superstructure; minimizing the risk of damage when being transported. Wheels mounted on the bottom facilitates the ability of the cart to roll. The cart also includes apparatus for directing the angle of the amplifier's speakers in order to improve sound projection.

2. Description of Prior Art

A long standing problem for musicians has been the need to transport heavy musical instrument amplification devices from place to place. These amplification devices customarily weigh in excess of 70 pounds and include integral loud speakers on one side of the device. Since these amplifiers are bulky with high centers of gravity; they tend to topple off ordinary flat bed carts, especially when the cart is moved on and off a bandstand or stage on which the musician is performing.

A further problem is that the angle of the amplifier's speakers (with respect to the bed or carrying surface of the cart) must often be varied to accommodate different stage conditions. Thus, it is often necessary for the musician to tilt the amplifier's speaker cabinet (up or down) in order to afford the best sound projection for a particular theater, club or other venue for performing.

To date the problem with prior amplifier stands includes the fact that the amplifier could easily fall off while being transported. Prior amplifier stands do little or nothing to protect the amplifier from damage during movement from location to location. To date, no piece of equipment solves the needs of a musician utilizing a musical instrument amplifier with the intent to transport that amplifier from one location to another as well as providing a tilting mechanism in which the amplifier is housed, thereby better enhancing the projection of sound. The inherent weight of a typical amplifier is such that it is difficult to readily transport it from one location to another. The combined weight of the amplifier and its physical dimensions greatly impedes the ability for one individual to readily move it.

U.S. Pat. No. 5,190,254 to Maguire discloses an amplifier stand which provides no method to facilitate transportation of the equipment. The '254 device does not provide means for changing the angle for sound projection enhancement. Further, the structure of the '254 device has no provision to hold additional equipment typically incorporated into the musician's sound system. The invention provides no method of protecting the amplifier from possible damage. Additionally, the stand is made to fold up. This method used for manufacture reduces the inherent safe load capacity needed to safely support heavy amplifiers.

The device in U.S. Pat. No. 4,321,874 to Cenna III has an intended purpose of supporting a keyboard instrument and cannot serve to support a musical instrument amplifier. What is needed is an amplifier stand that holds musical equipment during transport and which includes means for adjusting the angle of the amplifier's speakers.

The device in U.S. Pat. No. 5,024,407 to Bartley does not have sufficient stability to safely contain the speaker cabinet. The center of gravity of the device in relation to the speaker cabinet placement provides minimal stability if accidently hit or bumped from the side. Within the scope of this device nothing has been provided to protect the amplifier from possible damage.

OBJECTS AND ADVANTAGES

Accordingly, several objects and advantages of my invention are as follows:

One object of the invention is to provide a combination of a musical instrument amplifier stand and transport cart.

Another object of my invention is a musical instrument amplifier cart that securely encapsulates the amplifier within a tubular framed superstructure for the purpose of protecting the amplifier from damage while in use.

A further object of the invention is to provide a musical instrument amplifier cart capable of safely containing the amplifier during movement.

A further object of my invention is a musical equipment transport and storage stand which incorporates a mechanism for tilting the amplifier up and down and which includes a means for locking the amplifier into place at a desired angle.

Another object of the invention is a musician's transport and storage cart having a front horizontal column in conjunction with the horizontal adjustment bar affixed to the front and rear of the cart to restrict unwanted movement of musical equipment contained within the cart when equipment is moved from location to location.

Still further objects and advantages will become apparent from a consideration of the ensuing description and accompanying drawings.

BRIEF DESCRIPTION OF THE DRAWINGS

FIG. 3 is a top view of the cart depicting several of the cart's components including the fulcrum chassis, top shelf, crescent shaped lifting handles, and travel strap.

FIG. 4 is a right side view of the musical instrument cart and stand of the present invention.

FIG. 5 is a front view of the musical instrument amplifier cart and stand of the present invention. This figure depicts the true shape of the invention, identifies parts that restrain the amplifier in place and further shows the mechanism by which the amplifier may be tilted and locked at various angles.

SUMMARY OF THE INVENTION

Briefly summarized, the present invention provides a transportable cart and stand for a musical instrument amplifier including safe containment and a means for tilting the amplifier (while carried within the superstructure) to a multitude of angles in order to permit enhanced sound projection. Other features provide for further advancement in the invention's use and aesthetic appeal.

DETAILED DESCRIPTION OF THE PREFERRED EMBODIMENTS

Figure 1:
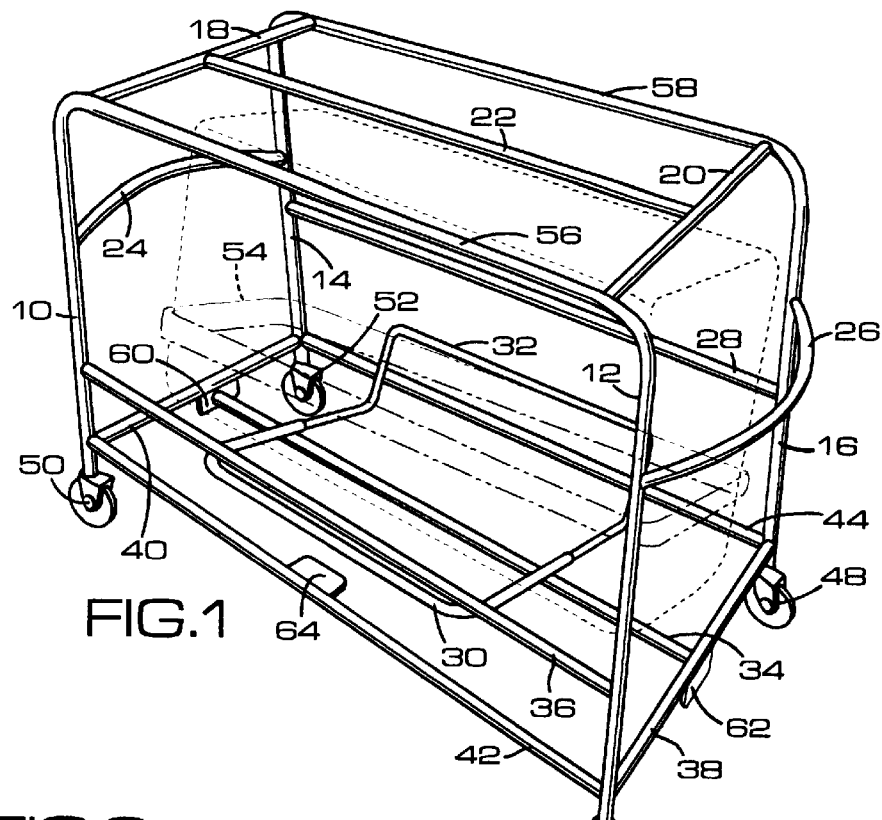
FIG. 1 is a perspective view of the musical instrument amplifier cart and stand of the present invention and includes the outline of an amplifier in a tilted position.

The musical instrument amplifier cart and stand according to the present invention is illustrated in FIG. 1. It can be seen that the musical instrument cart and stand of the present invention is a rectangular frame fabricated from metal tubing comprising of four generally vertical columns and four horizontal cross bars. Front left vertical support column 10, front right vertical support column 12, and front shelf column 56 are formed from one piece of metal tube bent on a jig to obtain its shape. Rear left vertical support column 14, rear right vertical support column 16 and rear shelf column 58 are formed from one piece of metal tube bent on a jig to obtain its shape. Shelf support tube (left side) 18, and shelf support tube (right side) 20 in conjunction with center shelf column 22 are joined together to add stability to the present invention's shape. Additionally, it provides a shelf which allows additional equipment to be placed on top for transport or used for holding musical accessory equipment. Left crescent shaped lifting handle 24 and right crescent shaped lifting handle 26 are attached to the sides to facilitate lifting when necessary. Horizontal adjustment bar 28 is attached to the rear side of the cart and functions in conjunction with other parts of the present invention to alter an amplifier's speakers direction of sound. Outer adjustable fulcrum chassis support shelf frame 30 and inner adjustable fulcrum chassis support shelf frame 32 are attached to fulcrum bar 34 and function to seat the musical instrument amplifier within its superstructure. Front horizontal amplifier restraining bar 36, chassis shelf support bar (right side) 38, chassis shelf support bar (left side) 40, front horizontal column 42, and rear horizontal column 44 function together to stabilize the lower portion of the carts shape and hold the fulcrum bar 34 into position. Right front wheel 46, right rear wheel 48, left front wheel 50, and left rear wheel 52 are affixed to the bottom four corners of the cart. Travel strap 54 is affixed to inner adjustable fulcrum chassis support shelf frame 32 and is provided to restrict the musical instrument amplifiers unwanted movement when transported.

Figure 2:
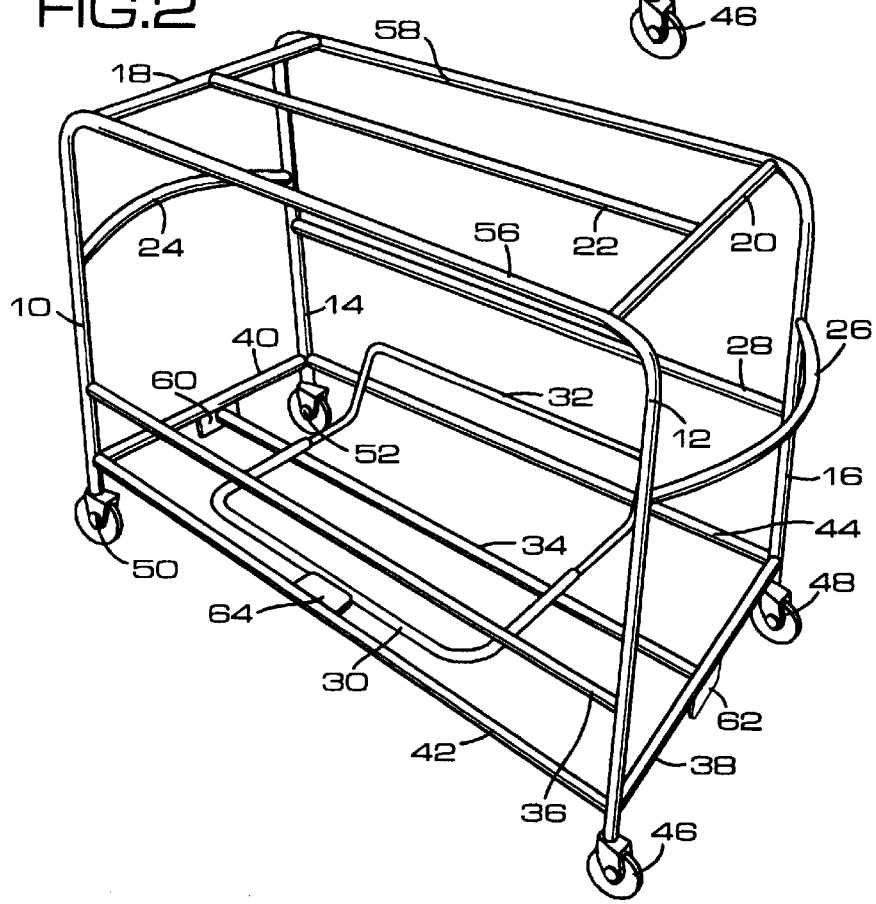
FIG. 2 shows another perspective view of the musical instrument amplifier cart and stand of the present invention.

FIG. 2 depicts the current invention from a perspective view without reflecting the outline of a musical instrument amplifier. Front left vertical support column 10, front right vertical support column 12, and front shelf column 56 are formed from a single piece of metal tubing which has been bent to shape. Rear left vertical support column 14, rear right vertical support column 16, and rear shelf column 58 are formed from a single piece of metal tubing which has been bent to shape. Shelf support tube (left side) 18 is attached at its forward end to front shelf column 56 via a tube connector. The tube connector becomes an anchor for machine screw fasteners when inserted into an open end of a tube. The tube connector's center has been drilled out and tapped to accept the machine screw fastener. A tube connector's shape is similar to a crown. The tube connectors outer most edges are flat. For its application, a tube connector is inserted into an open end of a tube. A second tube with an appropriate sized hole drilled through its wall is fitted with a machine screw. The screw is threaded into the tube containing the tube connector and tightened; thus, drawing two pieces of tube together to form a joint.

Tube connectors are commonly used in the manufacturing of furniture which may be partially or fully constructed from metal tubing. A tube connector is inserted into the forward end of shelf support tube (left side) 18. A hole is drilled through the wall of front shelf column 56 where the two parts intersect. A machine screw fastener is passed through the hole and threaded into the tube connector. The fastener is torqued to form a joint.

Shelf support tube (left side) 18 is attached at its rear end to rear shelf column 58 via a tube connector. A tube connector is inserted into the open end of shelf support tube (left side) 18. A hole is drilled through the wall of rear shelf column 58 where the parts intersect. A machine screw fastener is passed through the hole and threaded into the tube connector. The fastener is torqued to form a joint.

Shelf support tube (right side) 20 is attached at its forward end to front shelf column 56 via a tube connector. A tube connector is inserted into the open end of shelf support tube (right side) 20. A hole is drilled through the wall of front shelf column 56 where the two parts intersect. A machine screw fastener is passed through the hole and threaded into the tube connector. The fastener is torqued to form a joint. Shelf support tube (right side) 20 is connected at its rear end to rear shelf column 58 via a tube connector. A tube connector is inserted into the open end of shelf support tube (right side) 20. A hole is drilled through the wall of rear shelf column 58 where the two parts intersect. A machine screw fastener is passed through the hole and threaded into the tube connector. The fastener is torqued to form a joint.

Center shelf column 22 is attached on its left side to shelf support tube (left side) 18 in FIG. 2. Attachment of center shelf column 22 to shelf support tube (left side) 18 is via a weld. Center shelf column 22 is attached on its right side to shelf support tube (right side) 20. Location is on center as depicted in FIG. 2. Attachment of center shelf column 22 to shelf support tube (right side) is via a weld. Location is on center as depicted in FIG. 2.

Left crescent shaped lifting handle 24 is attached at its forward end to front left vertical support column 10 via a tube connector. A tube connector is inserted into the open end of left crescent shaped lifting handle 24. A hole is drilled through the wall of front left vertical support column 10 where the two parts intersect. A machine screw fastener is passed through the hole and threaded into the tube connector. The fastener is torqued to form a joint. Left crescent shaped lifting handle 24 is attached at its rear end to rear left vertical support column 14 via a tube connector. A tube connector is inserted into the open end of left crescent shaped lifting handle 24. A hole is drilled through the wall of rear left vertical support column 14 where the two parts intersect. A machine screw fastener is passed through the hole and threaded into the tube connector. The fastener is torqued to form a joint.

Right crescent shaped lifting handle 26 is attached on its forward end to front right vertical support column 12 via a tube connector. A tube connector is inserted into the open end of right crescent shaped lifting handle 26. A hole is drilled through the wall of front right vertical support column 12 where the two parts intersect. A machine screw fastener is passed through the hole and threaded into the tube connector. The fastener is torqued to form a joint. Right crescent shaped lifting handle 26 is attached at its rear end to rear right vertical support column 16 via a tube connector. A tube connector is inserted into the open end of right crescent lifting handle 26. A hole is drilled through the wall of rear right vertical support column where the two parts intersect. A machine screw fastener is passed through the hole and threaded into the tube connector. The fastener is torqued to form a joint.

Horizontal adjustment bar 28 is attached on its left side to rear left vertical support column 14. The attachment is accomplished with a hollow "T" fitting which is attached on to the left end of horizontal adjustment bar 28. The "T" fitting is fabricated from a metal casting. The diameter of the openings in the "T" fitting allows the "T" fitting to slidably receive the tubes forming the structure. The "T" fitting is then locked into place with a set screw. The vertical ends of the "T" fitting are hollow. The "T" fitting is slid over the open end of rear left vertical support column 14. This is done prior to rear left vertical support column 14 being attached to chassis shelf support bar (left side) 40 and prior to rear left vertical support column 14 being attached to rear horizontal column 44. This attachment of horizontal adjustment bar 28 as it is attached to the "T" fitting depicted in the current invention permits vertical movement of the part. A knob with a threaded stud is tapped into the walls of the "T" fitting, thus allowing the stud to contact the rear left vertical support column 14. When the knob is tightened, vertical movement is prevented.

Horizontal adjustment bar 28 is attached on its right side to rear right vertical support column 16. This attachment is accomplished with a hollow "T" fitting which is attached on to the right end of horizontal adjustment bar 28. The "T" fitting is fabricated from a metal casting. The diameter of the openings in the "T" fitting allows the "T" fitting to slidably receive the tubes forming the structure. The "T" fitting is then locked into place with a set screw. The vertical ends of the "T" fitting are hollow. The "T" fitting is slid over the open end of rear right vertical support column 16. This is done prior to rear right vertical support column 16 being attached to chassis shelf support bar (right side) 38 and prior to rear right vertical support column 16 being attached to rear horizontal column 44. This attachment of horizontal adjustment bar 28 as it is attached to the "T" fitting depicted in the current invention permits vertical movement of the part. A knob with a threaded stud is tapped into the "T" fitting's wall allowing the stud to come into contact with rear right vertical support column 16. When the knob is tightened, vertical movement is prevented.

Front horizontal amplifier restraining bar 36 is attached on its left end to front left vertical support column 10 via a tube connector. A tube connector is inserted into the open end of front horizontal amplifier restraining bar 36. A hole is drilled through the wall of front left vertical support column 10 where the two parts intersect. A machine screw fastener is passed through the hole and threaded into the tube connector. The fastener is torqued to form a joint. Front horizontal amplifier restraining bar 36 is attached on its right end to front right vertical support column 12 via a tube connector. A tube connector is inserted into the open end of front horizontal amplifier restraining bar 36. A hole is drilled through the wall of front right vertical support column 12 where the two parts intersect. A machine screw fastener is passed through the hole and threaded into the tube connector. The fastener is torqued to form a joint.

Front horizontal column 42 is attached on its left side to front left vertical support column 10 where the two parts intersect. Attachment of the two parts is via a weld. Front horizontal column 42 is attached on its right side to front right vertical support column 12 where the two parts intersect. Attachment of the two parts is via a weld.

Rear horizontal column 44 is attached on its left side to rear left vertical support column 14 where the two parts intersect. Attachment of the two parts is via a weld. Rear horizontal column 44 is attached on its right side to rear right vertical support column 16 where the two parts intersect. Attachment of the two parts is via a weld.

Chassis shelf support bar (left side) 40 is attached on its forward end to front left vertical support column 10 via a tube connector. A tube connector is inserted into the open end of chassis shelf support bar (left side) 40. A hole is drilled through the wall of front left vertical support column 10 where the two parts intersect. A machine screw fastener is passed through the hole and threaded into the tube connector. The fastener is torqued to form a joint. Chassis shelf support bar (left side) 40 is attached at its rear end to rear left vertical support column 14 via a tube connector. A tube connector is inserted into the open end of chassis shelf support bar (left side) 40. A hole is drilled through the wall of rear left vertical support column 14 where the two parts intersect. A machine screw fastener is passed through the hole and threaded into the tube connector. The fastener is torqued to form a joint.

Chassis shelf support bar (right side) 38 is attached at its forward end to front right vertical support column 12 via a tube connector. A tube connector is inserted into the open end of chassis shelf support bar (right side) 38. A hole is drilled through the wall of front right vertical support column 12 where the two parts intersect. A machine screw fastener is passed through the hole and threaded into the tube connector. The fastener is torqued to form a joint. Chassis shelf support bar (right side) 38 is attached at its rear end to rear right vertical support column 16 via a tube connector. A tube connector is inserted into the open end of chassis shelf support bar (right side) 38. A hole is drilled through the wall of rear right vertical support column 16 where the two parts intersect. A machine screw fastener is passed through the hole and threaded into the tube connector. The fastener is torqued to form a joint.

Fulcrum bar 34 is held in place on its left side via its insertion through left fulcrum bar flange 60. Left fulcrum bar 60 is fabricated from a metal plate. The center of the plate is drilled out to a diameter large enough to allow fulcrum bar 34 to pass through its opening. Left fulcrum bar flange 60 is welded on center to the underside of chassis shelf support bar (left side) 40. The left end of fulcrum bar 34 is then fitted through the hole in left fulcrum bar flange 60. Fulcrum bar 34 is held in place on its right side via its insertion through right fulcrum bar 62. Right fulcrum bar flange 62 is fabricated from a metal plate. The center of the plate is drilled out to a diameter large enough to allow fulcrum bar 34 to pass through its opening. Right fulcrum bar flange 62 is welded on center to the underside of chassis shelf support bar (right side) 38. The right end of fulcrum bar 34 is then fitted through the hole in right fulcrum bar flange 62.

Outer adjustable fulcrum chassis support shelf frame 30 and inner adjustable fulcrum chassis support shelf frame 32 are fitted together to form a shelf. Outer adjustable fulcrum chassis support shelf frame 30 and inner adjustable fulcrum chassis support shelf frame 32 are each formed from a single piece of tube which is bent to shape on a jig. Inner adjustable fulcrum chassis support shelf frame 32 has an outside diameter that is slightly less than the inside diameter of outer adjustable fulcrum chassis support shelf frame 30. Thus, when fitted together, one frame may slide freely in and out of the other frame. Outer adjustable fulcrum chassis support shelf frame 30 sits atop fulcrum bar 34. Outer adjustable fulcrum chassis support shelf frame 30 is located on a center portion of fulcrum bar 34 as depicted in FIG. 2. The top side of fulcrum bar 34 is welded in place onto the underside of outer adjustable fulcrum chassis support shelf frame 30.

Travel strap 54 is fabricated from nylon webbing. Travel strap 54 attachment to inner adjustable fulcrum chassis support shelf frame 32 is via sheet metal screws inserted through the webbing material and anchored onto each end of the rear side of inner adjustable fulcrum chassis support shelf frame 32.

Right front wheel 46 is attached to the bottom of front right vertical support column 12. Right front wheel 46 is fitted with a stud. Front right vertical support column 12 is fitted with an insert compatible with the wheel's stud. The wheel is secured into the insert. Right rear wheel 48 is attached to the bottom of rear right vertical support column 16. Right rear wheel 48 is fitted with a stud. Rear right vertical support column 16 is fitted with an insert compatible with the wheels stud. The wheel is secured into the insert. Left front wheel 50 is attached to the bottom of front left vertical support column 10. Left front wheel 50 is fitted with a stud. Front left vertical support column 10 is fitted with an insert compatible with the wheels stud. The wheel is secured into the insert. Left rear wheel 52 is attached to rear left vertical support column 14. Left rear wheel 52 is fitted with a stud. Rear left vertical support column 14 is fitted with an insert compatible with the wheels stud. The wheel is secured into the insert.

FIG. 3 is a top view of the current invention. This view depicts the invention's top shelf, lifting handles, and fulcrum chassis. Front shelf column 56 is attached to the front side of shelf support tube (left side) 18 where the two parts intersect. Attachment of the two parts is via a tube connector. A tube connector is inserted into the open end of shelf support tube (left side) 18. A hole is drilled through the wall of front shelf column 56 where the two parts intersect. A machine screw fastener is passed through the hole and threaded into the tube connector. The fastener is torqued to form a joint.

Rear shelf column 58 is attached to the rear end of shelf support tube (left side) 18 where the two parts intersect. Attachment of the two parts is via a tube connector. A tube connector is inserted into the open end of shelf support tube (left side) 18. A hole is drilled through the wall of rear shelf column 58 where the two parts intersect. A machine screw fastener is passed through the hole and threaded into the tube connector. The fastener is torqued to form a joint.

Front shelf column 56 is attached to the front side of shelf support tube (right side) 20 where the two parts intersect. Attachment of the two parts is via a tube connector. A tube connector is inserted into the open end of shelf support tube (right side) 20. A hole is drilled through the wall of front shelf column 56 where the two parts intersect. A machine screw fastener is passed through the hole and threaded into the tube connector. The fastener is torqued to form a joint.

Rear shelf column 58 is attached to the rear end of shelf support tube (right side) 20 where the two parts intersect. Attachment of the two parts is via a tube connector. A tube connector inserted into the open end of shelf support tube (right side) 20. A hole is drilled through the wall of rear shelf column 58 where the two parts intersect. A machine screw fastener is passed through the hole and threaded into the tube connector. The fastener is torqued to form a joint.

Fulcrum bar 34 is depicted in FIG. 3 and shows its specific location in relation to the outer frame work of the amplifier cart and stand of the present invention. Fulcrum bar 34 is attached on the left side to the underside of chassis shelf support bar (left side) 40. This attachment is via insertion of a the left side of fulcrum bar 34 through left fulcrum bar flange 60 which is affixed to the underside of chassis shelf support bar (left side) 40. Left fulcrum bar flange 60 is welded on center to the underside of chassis shelf support bar (left side) 40. Left fulcrum bar flange 60 is provided with a hole drilled through the flange which is large enough to allow fulcrum bar 34 to pass through its opening. The left end of fulcrum bar 34 is then slid into left fulcrum bar flange 60.

Fulcrum bar 34 is attached on the right side to the underside of chassis shelf support bar (right side) 38. This attachment is via insertion of the right side fulcrum bar 34 through right fulcrum bar flange 62 which is affixed to the underside of chassis shelf support bar (right side) 38. Right fulcrum bar flange 62 is welded on center to the underside of chassis shelf support bar (right side) 38. Right fulcrum bar flange 62 is provided with a hole drilled through the flange which is large enough to allow fulcrum bar 34 to pass through its opening. The right end of fulcrum bar 34 is then slid into right fulcrum bar flange 62.

Outer adjustable fulcrum chassis support shelf frame 30 is affixed to the top of fulcrum bar 34 as depicted in FIG. 3. Attachment of outer adjustable fulcrum chassis support shelf frame 30 to fulcrum bar 34 is via a weld. The underside of outer adjustable fulcrum chassis support shelf frame 30 is welded to the top of fulcrum bar 34. Inner adjustable fulcrum chassis support shelf frame 32 is attached to outer adjustable fulcrum chassis support shelf frame 30. Outer adjustable fulcrum chassis support shelf frame 30 and inner adjustable fulcrum chassis support shelf frame 32 are components that when joined together form a shelf to support the musical instrument amplifier. Outer adjustable fulcrum chassis support shelf frame 30 and inner adjustable fulcrum chassis support shelf frame 32 are individually formed from a single piece of tubing which is bent to shape on a jig. The outside diameter of inner adjustable fulcrum chassis support shelf frame 32 is small enough for it to pass freely through the inside wall of outer adjustable fulcrum chassis support shelf frame 30. Set screws are tapped through the walls of outer adjustable fulcrum chassis support shelf frame 30. Thus, when the set screws are tightened, a specific depth of the two components is maintained.

Travel strap 54 is depicted and shows its location within the superstructure. Travel strap 54 is fabricated from nylon webbing and attached to the back side of inner adjustable fulcrum chassis support shelf frame 32. Attachment of travel strap 54 to inner adjustable fulcrum chassis support shelf frame 32 is via sheet metal screws. Sheet metal screws are inserted through the webbing of travel strap 54 and then screwed into the back side of inner adjustable fulcrum chassis support shelf frame 32.

FIG. 4 depicts the current invention in a right side view. The vertical height location of right crescent shaped lifting handle 26 is depicted in addition to the specific location of right front wheel 46. Further, FIG. 4 shows the location of right fulcrum bar flange 62 and inner adjustable fulcrum chassis support shelf frame 32. The vertical position of right crescent shaped lifting handle 26 is depicted. This vertical location allows a user to lift the current invention and its contents. Right crescent shaped lifting handle 26 is attached on its forward end to front right vertical support column 12 via a tube connector. A tube connector is inserted into the open end of right crescent shaped lifting handle 26. A hole is drilled through the wall of front right vertical support column 12 where the two parts intersect. A machine screw fastener is passed through the hole and threaded into the tube connector. The fastener is torqued to form a joint.

Right crescent shaped lifting handle 26 is attached at its rear end to rear right vertical support column 16 via a tube connector. A tube connector is inserted into the open end of right crescent shaped lifting handle 26. A hole is drilled through the wall of rear right vertical support column 16 where the two parts intersect. A machine screw fastener is passed through the hole and threaded into the tube connector. The fastener is torqued to form a joint.

Chassis shelf support support bar (right side) 38 is attached at its forward end to front right vertical support column 12 via a tube connector. A tube connector is inserted into the open end of chassis shelf support support bar (right side) 38. A hole is drilled through the wall of front right vertical support column 12 where the two parts intersect. A machine screw fastener is passed through the hole and threaded into the tube connector. The fastener is torqued to form a joint. Chassis shelf support bar (right side) 38 is attached at its rear end to rear right vertical support column 16 via a tube connector. A tube connector is inserted into the open end of chassis shelf support bar (right side) 38. A hole is drilled through the wall of rear right vertical support column 16 where the two parts intersect. A machine screw fastener is passed through the hole and threaded into the tube connector. The fastener is torqued to form a joint.

Right fulcrum bar flange 62 is depicted in FIG. 4 and shows right fulcrum bar flange 62 located on a center portion of the underside of chassis shelf support bar (right side) 38. Attachment of right fulcrum bar flange 62 to the underside of chassis shelf support bar (right side) 38 is via a weld.

Right front wheel 46 is attached to the bottom of front right vertical support column 12. A stud is attached to right front wheel 46. An insert which is compatible with the stud is inserted into the bottom of front right vertical support column 12. The wheel is secured to the insert thus, firmly holding the wheel in place. Right rear wheel 48 is attached to the bottom of rear right vertical support column 16. A stud is attached to right rear wheel 48. An insert which is compatible with the stud is inserted into the bottom of rear right vertical support column 16. The wheel is secured to the insert thus, firmly holding the wheel in place.

FIG. 5 depicts the current invention from a forward view. This view depicts the specific shape of the amplifier cart and stand. This view further depicts the vertical location of left crescent shaped lifting handle 24 and right crescent shaped lifting handle 26. Further, the vertical location of front horizontal amplifier restraining bar 36 is depicted. Front left vertical support column 10, front shelf column 56, and front right vertical support column 12 are fabricated from a single piece of tube bent to its shape on a jig. Left crescent shaped lifting handle 24 is attached on its forward end to front left vertical support column 10 via a tube connector. Its vertical location is such as to facilitate lifting of the amplifier cart and stand. A tube connector is inserted into the open end of left crescent moon lifting handle 24. A hole is drilled through the wall of front left vertical support column 10 where the parts intersect. A machine screw fastener is passed through the hole and threaded into the tube connector. The fastener is torqued to form a joint.

Right crescent shaped lifting handle 26 is attached on its forward end to front right vertical support column 12 via a tube connector. Its vertical location is such as to facilitate lifting of the amplifier cart and stand. A tube connector is inserted into the open end of right crescent shaped lifting handle 26. A hole is drilled through the wall of front right vertical support column 12 where the two parts intersect. A machine screw fastener is passed through the hole and threaded into the tube connector. The fastener is torqued to form a joint.

Front horizontal amplifier restraining bar 36 and its vertical location is depicted in FIG. 5. Front horizontal amplifier restraining bar 36 is attached on its left side to front left vertical support column 10 via a tube connector. A tube connector is inserted into the open end of front horizontal amplifier restraining bar 36. A hole is drilled through the wall of front left vertical support column 10 where the two parts intersect. A machine screw fastener is passed through the hole and threaded into the tube connector. The fastener is torqued to form a joint. Front horizontal amplifier restraining bar 36 is attached on its right side to front right vertical support column 12 via a tube connector. A tube connector is inserted into the open end of front horizontal amplifier restraining bar 36. A hole is drilled through the wall of front right vertical support column 12 where the two parts intersect. A machine screw fastener is passed through the hole and threaded into the tube connector. The fastener is torqued to form a joint. FIG. 5 depicts stop tab 64 its location when attached to front horizontal column 42. The top of stop tab 64 is welded on a center portion of the underside of front horizontal column 42.

PREFERRED EMBODIMENT—OPERATION

The musical instrument amplifier cart and stand in FIGS. 1 and 2 depict a three dimensional tubular superstructure in which a musical instrument amplifier is placed. This superstructure offers protection from damage to the encapsulated amplifier. Front left vertical support column 10, front shelf column 56, and front right vertical support column 12 are fabricated from a single piece of bent metal tubing. Rear left vertical support column 14, rear shelf column 58, and rear right vertical support column 16 are fabricated from a single piece of bent metal tubing. When these pieces are joined together with shelf support tube (left side) 18, shelf support tube (right side) 20, chassis shelf support support bar (right side) 38, and chassis shelf support bar (left side) 40 they form the basis of a rigid structure capable of protecting an encapsulated amplifier from potential damage. Front horizontal amplifier restraining bar 36 is attached to front left vertical support column 10 and front right vertical support column 12. Horizontal adjustment bar 28 is attached to rear left vertical support column 14 and rear right vertical support column 16.

A shelf located on the top portion of the present invention is depicted in FIGS. 1 and 2. The purpose of the shelf is to avail the musician the option of stacking additional amplifiers or electronics effects components safely on top of the cart and stand when performing. Further, this shelf is capable of supporting significant loads; thus permitting the cart to transport additional equipment, i.e., speaker cabinets, drum cases, staging equipment, etc. Shelf support tube (left side) 18, shelf support tube (right side) 20, center shelf column 22, front shelf column 56, and rear shelf column 58 are joined together to form this integral shelf.

FIGS. 1 and 2 depict lifting handles. The generous size of each handle permits one to use two hands on each handle in order to lift particularly heavy loads. Left crescent shaped lifting handle 24 is attached on its front end to front left vertical support column 10. Left crescent shaped lifting handle 24 is attached at its rear to rear left vertical support column 14. Right crescent shaped lifting handle 26 is attached on its front end to front right vertical support column 12. Right crescent shaped lifting handle 26 is attached at the rear end to rear right vertical support column 16. The vertical placement of the handles are to improve lifting leverage and reduce potential physical discomfort while lifting heavy loads. The attachment of the handles additionally adds stability to the structure.

FIGS. 1 and 2 depict a rectangular frame near the base of the amplifier cart and stand of the present invention. This frame serves two purposes. First, the frame as attached to its parts adds rigidity to the structure for additional integrity. Second, this frame supports a mechanism for tilting the musical instrument amplifier's speakers for sound enhancement. This frame is comprised of chassis shelf support bar (left side) 40, chassis shelf support support bar (right side) 38, front horizontal column 42, and rear horizontal column 44. Chassis shelf support bar (left side) 40 is attached at its front end to front left vertical support column 10. Chassis shelf support bar (left side) 40 is attached at its rear end to rear left vertical support column 14. Chassis shelf support support bar (right side) 38 is attached at its front end to front right vertical support column 12. Chassis shelf support support bar (right side) 38 is attached at its rear end to rear right vertical support column 16. Front horizontal column 42 is attached on its left side to front left vertical support column 10. Front horizontal column 42 is attached on its right side to front right vertical support column 12. Rear horizontal column 44 is attached on its left side to rear left vertical support column 14. Rear horizontal column 44 is attached on its right side to rear right vertical support column 16.

FIG. 3 depicts the present invention's fulcrum chassis. A musical instrument amplifier sits on top of this chassis which bears the load of the amplifier. The chassis provides two functions for the current invention. First, it permits the encapsulated amplifier to be tilted back to a designated position in order to enhance the projection of sound. Second, its side frames reciprocate in order to accommodate various depth requirements of numerous amplifier manufacturers. Outer adjustable fulcrum chassis support shelf frame 30, inner adjustable fulcrum chassis support shelf frame 32, fulcrum bar 34, left fulcrum bar flange 60, and right fulcrum bar flange 62 comprise the adjustable mechanism. The outside wall thickness of the inner adjustable fulcrum chassis support shelf frame 32 is slightly less than that of outer adjustable fulcrum chassis support shelf frame 30. This permits the inner adjustable fulcrum chassis support shelf frame 32 to be fitted within the outer adjustable fulcrum chassis support shelf frame 30, thereby permitting depth adjustment. Inner adjustable fulcrum chassis support shelf frame 32 slides within outer adjustable fulcrum chassis support shelf frame 30 to facilitate this task. The outer adjustable fulcrum chassis support shelf frame 30 sits atop fulcrum bar 34. The top of fulcrum bar 34 is welded to the bottom of outer adjustable fulcrum chassis support shelf frame 30 where the two parts intersect.

FIGS. 2 and 4 depict the fulcrum bars attachment to the amplifier cart and stand of the present invention. The fulcrum bar forms the basis of the tilting mechanism. Its attachment to the flanges is such as to not restrict the bars ability to roll. Fulcrum bar 34 left end fits into left fulcrum bar flange 60 which is attached to the underside of shelf support tube (left side) 18. The left fulcrum bar flange 60 is located on center. Fulcrum bar 34 right end fits into right fulcrum bar flange 62 which is attached to the underside of shelf support tube (right side) 20. The right fulcrum bar flange 62 is located on center. The left fulcrum bar flange 60 and right fulcrum bar flange 62 allows fulcrum bar 34 to pivot forward or backward. Stop tab 64 as depicted in FIG. 3 functions to stop the fulcrum chassis from tilting too far forward into what would equate to a negative position. Stop tab 64 is attached on center to the underside of front horizontal column 42. When a musical instrument amplifier is placed within the structure, the top surface of stop tab 64 bears the compressed load of outer adjustable fulcrum chassis support shelf frame 30. The stop tab 64 functions by not permitting the fulcrum chassis to move into a negative angle (forward and downward facing).

FIG. 5 depicts the current invention's front horizontal restraining bar 36 and horizontal adjustment bar 28. When the musical instrument amplifier is placed within the structure it is necessary for the amplifier to be moved forward until the front side of the amplifier comes into contact with the rear side of front horizontal amplifier restraining bar 36 in order to prevent the amplifier from moving forward and falling out of the structure. Further, front horizontal amplifier restraining bar 36 provides protection from damage to the contained equipment and adds structural stability to the present invention. Front horizontal amplifier restraining bar 36 is attached on its left side to front left vertical support column 10 via a tube connector as previously described. Front horizontal amplifier restraining bar 36 is attached on its right side to front right vertical support column 12 via a tube connector as previously described. Horizontal adjustment bar 28 is attached to its parts in a manner that permits vertical movement when required. The back side of the musical instrument amplifier is required to be in contact with the front wall of horizontal adjustment bar 28. Lowering horizontal adjustment bar 28 and pushing the front top portion of the amplifier back permits the amplifier to roll into a tilted position. Raising or lowering horizontal adjustment bar 28 will dictate the angle at which the amplifier's speakers will assume. Thus, front horizontal amplifier restraining bar 36 and horizontal adjustment bar 28 function to restrict the amplifier's forward movement and adjust the speakers angle. The musical instrument amplifier is placed on the fulcrum chassis. The inner adjustable fulcrum chassis support shelf frame 32 is pushed inward (towards the front of the cart) until the front of the amplifier comes into contact with the front horizontal amplifier restraining bar 36. The contained musical instrument amplifier now has the ability to be tilted into a desired angle for sound enhancement. The fulcrum rolls back when the top front portion of the amplifier is pushed. The back side of the musical instrument amplifier then comes into contact with the front wall of horizontal adjustment bar 28. By lowering the horizontal adjustment bar 28 the angle is increased. By raising the horizontal adjustment bar 28 the angle is decreased. Knobs with studs attached to them are tapped into the wall of the "T" fittings attached at each end of horizontal adjustment bar 28. Tightening the studs thereby locks the horizontal adjustment bar 28 into a desired position. Horizontal adjustment bar 28 is fitted on its left end with a "T" fitting which slides over rear left vertical support column 14. Horizontal adjustment bar 28 is fitted on its right end with a "T" fitting which slides over rear right vertical support column 16.

FIG. 5 depicts the travel strap 54. The purpose of the travel strap 54 is to immobilize the musical instrument amplifier when the equipment is being transported. Travel strap 54 is fabricated from nylon webbing and is long enough to encompass the full width and height of the amplifier. Travel strap 54 is lashed horizontally and vertically around the contained amplifier and cinched tight thus restricting any movement. Travel strap 54 is affixed to the back side of inner adjustable fulcrum chassis support shelf frame 32. It is attached with self tapping sheet metal screws which pass through the nylon webbing and anchored into the rear wall of inner adjustable fulcrum chassis support shelf frame 32.

FIGS. 2 and 5 depict wheels attached to the four bottom corners of the cart. The present invention amplifier cart and stand provides high load capacity wheels with the ability to easily roll over a variety of surfaces. Left front wheel 50 is attached to the bottom of front left vertical support column 10. Right front wheel 46 is attached to the bottom of front right vertical support column 12. Left rear wheel 52 is attached to the bottom of rear left vertical support column 14. Right rear wheel 48 is attached to the bottom of rear right vertical support column 16.

CONCLUSIONS, RAMIFICATIONS, AND SCOPE

Accordingly, it can be seen that the superstructure is an encapsulated musical instrument amplifier cart and stand. This encapsulation method safely contains the equipment from potential damage when transported. The wheels provide a mechanism for easily moving the amplifier from one location to another. This, in conjunction with the ability of the cart and stand to vary the direction of the sound being generated is readily understood by review of this text. No previous invention provides this functional combination.

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their legal equivalents, rather than by the examples given. Changing the size allows other items or electronic equipment to be housed within the cart's structure. As an example, electronic medical equipment which is awkward due to its size and/or weight and possibly containing a viewing screen can utilize the invention. Further, this invention could be used to house and move computers and related equipment. Changes in the shape thus changes the capacity of the current invention's uses. Further, changes in the shape thus may change the styling of the invention. This may create the potential for broader appeal.

What is claimed is:

1. A cart and stand for transporting and supporting a musical instrument amplifier, comprising:
    an open frame defining an amplifier-receiving space therein, the frame including a superstructure surrounding the amplifier-receiving space;
    an amplifier support chassis supported by the frame so as to be pivotable about a generally horizontal pivot axis, the support chassis including an outer chassis support shelf frame and an inner chassis support shelf frame telescopingly received by the outer chassis support shelf frame such that the support chassis is adjustable in depth to accommodate variously sized amplifiers supported thereon, the support chassis further including a fulcrum bar rotatable supported by the frame and affixed to one of the outer and inner chassis support shelf frames such that the support chassis is rotatable about the pivot axis to be adapted to place the amplifier in a desired angular position with respect to the frame;
    a locking mechanism for fixing the amplifier support chassis in the desired angular position;
    an amplifier restraint attached to the amplifier support chassis for preventing unwanted movement of the amplifier within the frame;
    a storage rack supported by the frame vertically above the amplifier-receiving space and adapted to support electronic accessories; and
    a plurality of wheels attached to the frame to facilitate movement of the cart.

2. A musical instrument amplifier cart and stand as set forth in claim 1 wherein the frame includes a front left vertical support column, front right vertical support column, rear left vertical support column, and rear right vertical support column surrounding the amplifier-receiving space, the columns providing structural rigidity to the cart as well as protecting an amplifier supported therein.

3. A musical instrument amplifier cart and stand as set forth in claim 1 wherein the storage rack includes a left shelf support tube, a right shelf support tube, and a center shelf column,
    for storing and moving additional musical equipment or accessories,
    said shelf to add additional rigidity to the superstructure.

4. A musical instrument amplifier cart and stand as set forth in claim 1, further comprising a left crescent shaped lifting handle and right crescent shaped lifting handle,
    said handles positioned so as to facilitate lifting of the cart and its contents,
    said handles to be capable of supporting the load capacity of the cart and its contents,
    said handles being large enough so that each can be readily grasped by more than one hand.

5. A musical instrument amplifier cart and stand as set forth in claim 1, wherein the amplifier support chassis further includes a fulcrum bar, right and left chassis shelf support bars, a left fulcrum bar flange affixed to the left chassis shelf support bar, and a right fulcrum bar flange affixed to the right chassis shelf support bar, the fulcrum bar being rotatable within the fulcrum bar flanges about the pivot axis so as to tilt an encapsulated musical equipment amplifier to a designated angle in order to enhance sound projection,
    said amplifier support chassis welded to the fulcrum bar to form a rigid component,
    said fulcrum bar held in place by the left fulcrum bar flange and right fulcrum bar flange.

6. A musical instrument amplifier cart and stand as set forth in claim 1, further comprising a stop tab and a front horizontal column forming an integral part of the frame, the stop tab being secured to the front horizontal column and positioned to limit the extent to which the amplifier support chassis is capable of tilting.

7. A musical instrument amplifier cart and stand as set forth in claim 1, further comprising a horizontal adjustment bar, and a front horizontal amplifier restraining bar for preventing forward movement of the musical instrument amplifier;
    said front horizontal amplifier restraining bar being positioned to contact the front side of the musical instrument amplifier,
    said horizontal adjustment bar being positioned to contact the rear side of the musical instrument amplifier,
    said horizontal adjustment bar being capable of vertical movement
    so as to vary the angle at which the musical instrument amplifier will be tilted into.

8. A musical instrument amplifier cart and stand as set forth in claim 1, wherein the amplifier restraint is a travel strap, said travel strap affixed to the rear side of the inner chassis support shelf frame, said travel strap being adapted to encompass the musical instrument amplifier contained within the superstructure, said travel strap when cinched in place around a musical instrument amplifier being adapted to prevent any unnecessary movement of the amplifier when being transported.

9. A musical instrument amplifier cart and stand as set forth in claim 2 wherein the wheels are affixed to the bottom of the front left vertical support column, front right vertical support column, rear left vertical support column, and rear right vertical support column, said wheels including a right front wheel, right rear wheel, left front wheel, and left rear wheel to facilitate the movement of the cart, said wheels being load bearing to facilitate safe movement when additional loads are being transported, said wheels capable of easy movement over a variety of surfaces, said wheels each having a locking device to prevent movement when necessary.

10. The cart and stand for musical equipment instrument amplifiers of claim 1, wherein the cart includes a tubular metal superstructure.

11. The cart and stand for musical equipment instrument amplifiers of claim 1, wherein the cart has a generally rectangular shape.

12. The cart and stand for musical instrument amplifiers of claim 1, wherein the storage rack defines a top horizontal surface of the cart, the horizontal surface being capable of supporting said equipment, the cart thereby being adapted to function as a vehicle to move said equipment.

13. The cart and stand for musical equipment instrument amplifiers of claim 1, the functioning as a stand for said equipment.

* * * * *